United States Patent [19]

Tisma

[11] 4,342,352
[45] Aug. 3, 1982

[54] TRACTION DEVICE FOR VEHICLE WHEEL

[76] Inventor: Ilie Tisma, 4563 Polk St., Gary, Ind. 46408

[21] Appl. No.: 130,735

[22] Filed: Mar. 17, 1980

[51] Int. Cl.³ .............................................. B60C 27/00
[52] U.S. Cl. .............................. 152/225 C; 24/263 A; 152/213 R
[58] Field of Search ........... 152/225 C, 225 R, 213 R, 152/214, 218; 24/263 A; 81/15.8; 269/253, 70, 94, 63, 74; 254/50.1–50.4

[56] References Cited

U.S. PATENT DOCUMENTS

| | | | |
|---|---|---|---|
| 2,179,896 | 11/1939 | Neville | 254/50.1 X |
| 2,208,343 | 7/1940 | Reiter | 24/263 A UX |
| 2,448,535 | 9/1948 | Leveira | 269/70 |
| 2,572,306 | 10/1951 | Brenton | 152/225 C UX |
| 2,704,951 | 3/1955 | Petersen | 269/70 X |
| 3,038,203 | 6/1962 | Gross | 254/50.1 UX |
| 3,044,116 | 7/1962 | Spitzmiller et al. | 254/50.1 X |
| 3,068,925 | 12/1962 | Stephens | 152/225 C UX |
| 4,181,296 | 1/1980 | Bassett | 269/253 X |

Primary Examiner—John E. Kittle
Assistant Examiner—Thomas Bokan
Attorney, Agent, or Firm—Walter Leuca

[57] ABSTRACT

This invention is a traction device for a vehicle wheel. It comprises a shoe member adapted to seat onto the tread of a tire. One side of the shoe has upstanding bars for supporting an inwardly extending curvilinear member for bracing against the side wall of the tire adjacent the rim of the wheel. The other side of the shoe is provided with upstanding bars which support a rectangular frame to which is pivotally hinged a base on which is mounted a laterally movable curvilinear member which is clamped against the outside wall of the tire adjacent the rim of the wheel. The clamping device includes a screw means having a head keyed to be rotated by a releasable crank. The clamp device of this invention incorporates screw means which moves to tighten and loosen the clamp member in small increments as well as hinge or pivot means which radially moves a substantial distance to position the clamp member adjacent the tire side wall.

4 Claims, 4 Drawing Figures

TRACTION DEVICE FOR VEHICLE WHEEL

BACKGROUND OF THE INVENTION

1. Field of the Invention

This invention relates generally to traction devices and more particularly to a traction device for a vehicle wheel.

2. Description of the Prior Art

The problems of the prior art to which this invention is directed is the provision of a traction device which is easy to connect and disconnect from the tire. The prior art devices to which this invention pertains are complicated in structure making them expensive to manufacture and if adapted to connect to the tire, do not possess a sufficient range of dimensional adjustment to accommodate wide differences in tire sizes.

The present invention is novel in that its structure is simple and economical to manufacture and its clamping member possesses a wide adjustable range enabling application to different sizes or tires. This is accomplished by providing a shoe member being radially curvilinear in longitudinal dimension to seat onto the tread of a tire. The exterior surface of the shoe member is provided with spaced lateral grip bars for providing a positive traction surface by which means the rotating tire travels without slippage. One side of the shoe has upstanding bars for supporting an inwardly extending curvilinear member for bracing against the side wall of the tire adjacent the rim of the wheel. The other side of the shoe is provided with upstanding bars which support a rectangular frame to which is pivotally hinged a base on which is mounted a laterally movable curvilinear member which is clamped against the outside wall of the tire adjacent the rim of the wheel. The clamping device includes a screw means having a head keyed to be rotated by a releasable crank. The clamp device of this invention incorporates screw means which moves to tighten and loosen the clamp member in small increments as well as hinge or pivot means which radially moves a substantial distance to position the clamp member adjacent the tire side wall.

Other objects and advantages of the present invention will become more apparent after a careful study of the following specification taken with reference to the accompanying drawings which illustrate a preferred embodiment thereof.

DESCRIPTION OF THE PREFERRED EMBODIMENT

Figure 1:
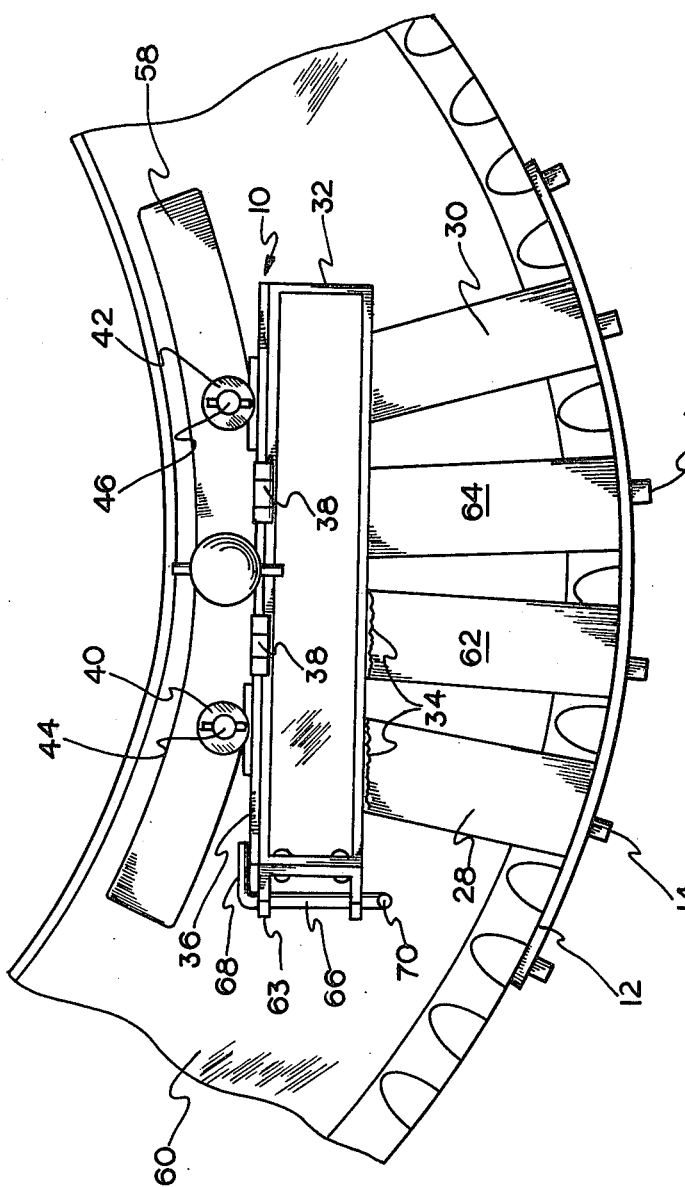
FIG. 1 is a side view of this invention shown connected to a vehicle tire which is illustrated in fragment.
Figure 2:
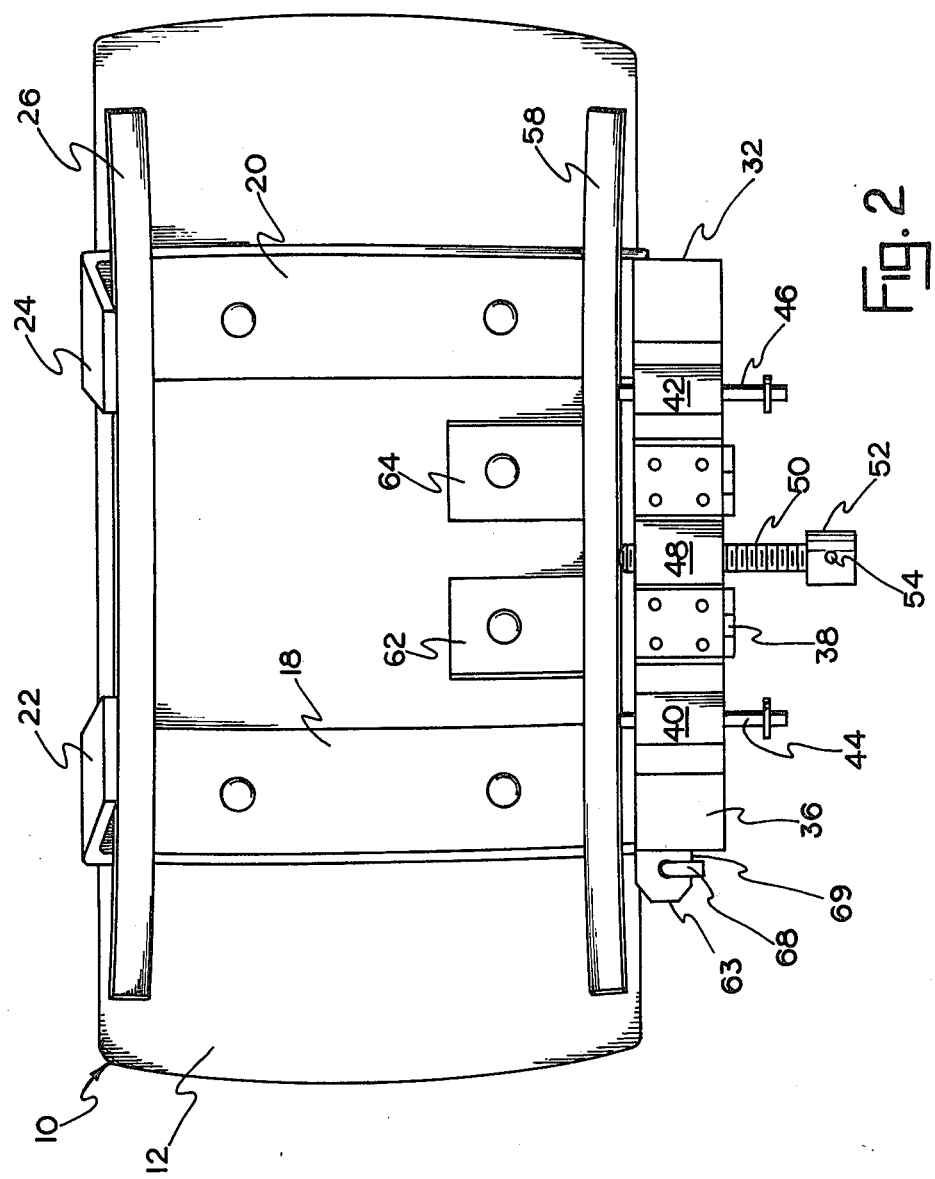
FIG. 2 is a top view of the traction device of this invention shown disassociated from the tire.
Figure 3:
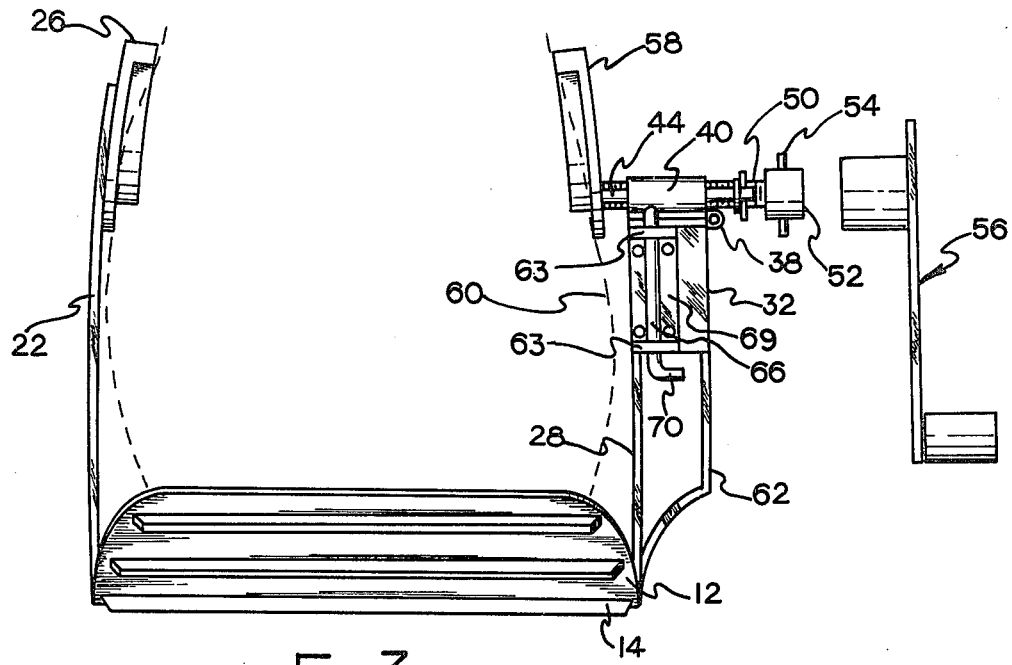
FIG. 3 is an end view of the traction device of this invention showing the crank member in exploded relation to the clamp member; the outline of the tire is shown by dotted lines.
Figure 4:
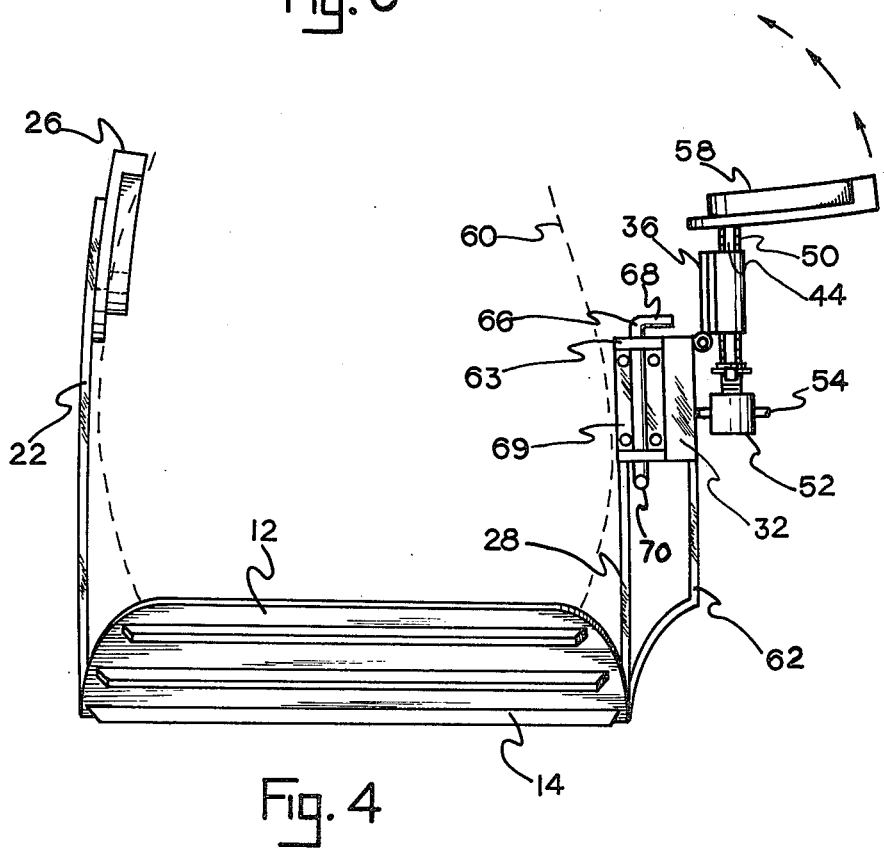
FIG. 4 is a similar end view thereof illustrating a clamp member in its pivot-open position.

Referring now more particularly to the drawing wherein is illustrated a preferred embodiment of my invention, numeral 10 designates generally the traction device of my invention.

It comprises a longitudinally curved shoe member 12, the bottom side of which has connected thereto by any convenient means rib member 14 spaced along the longitudinal length thereof. Connected on the top side of shoe 12 are "U" shaped bar members 18 and 20, respectively, which laterally span the width of shoe member 12. Connected to the top of upstanding legs 22 and 24 of "U" shaped bar members 18 and 20, respectively, is an inwardly extending longitudinally curved bar member 26 adapted to brace against the tire side wall adjacent the wheel rim. Opposite upstanding legs 28 and 30 of "U" shaped bars 18 and 20 are shorter in length than legs 22 and 24 and are formed to support a longitudinally positioned rectangular frame 32 formed by shaping a flat bar into a rectangular configuration so that the bottom side is connected to legs 28 and 30 by any convenient means such as weldments 34 as shown in FIG. 1. Bar flat 36 is hingedly connected to the top side of rectangular frame 32 as at 38 to allow lateral pivot movement of bar flat 36 relative to rectangular frame 32. Connected to the top side of bar flat 36 at distances equally spaced from the middle section thereof, are guided sleeves 40 and 42 adapted to support laterally movable pins 44 and 46 respectively. Connected to bar flat 36 at the middle section thereof is threaded sleeve 48 formed to receive therethrough threaded shaft 50. Cap 52 provided on the end of threaded shaft 50 is formed with key means 54 and adapted to be releasably connected by crank member 56. Longitudinally curved clamp member 58 is connected to the ends of pins 44 and 46 and thereby supported in opposite facing relation to longitudinally curved bar member 26. The end of threaded shaft 50 abuts against the side of longitudinally curved bar member 58 to advance bar member 58 inwardly against the side wall of the tire 60 when shaft 50 is rotated by crank member 56. Opposite rotation of threaded shaft 50 releases the clamping force exerted by bar member 58 against tire 60 thereby allowing curved bar member 58 to be moved on its pin members 44 and 46 away from the side wall of tire 60 when release is desired. Bars 62 and 64 connect the bottom side of rectangular frame 32 and the body of shoe member 12 and serves to reinforce the support for frame 32.

Bracket 69 is connected to the end of rectangular frame 32. Top and bottom flanges 63 are provided with vertically aligned holes which receive pin member 66, the end 68 thereof is formed at right angles to serve as a clamp to hold down bar flat 36. Bottom end 70 is also formed at right angles to pin 66 to pivot end 68 in and out of clamping engagement on bar flat 36.

I prefer to form legs 22, 24 and 28, 30, slightly inclined toward each other, respectively, to more closely embrace the narrowed cross section of the tire and also to slightly tilt bar flat 36 below the horizontal plane so that when pressure is applied by clamp bar member 58, when screwing threaded shaft 50 against clamp bar member 58 which biases against the side wall of tire 60, the reaction force against bar flat 36 will have a vertical component directed downwardly which will contribute to keep bar flat 36 from pivotally swinging open on hinges 38.

In the operation of this invention threaded shaft 50 is rotated so that clamp bar member 58 may be laterally positioned in its retracted position. Bar flat 36 on which is mounted pin support sleeve members 40 and 42 and threaded shaft 50 is pivotally tipped to remove clamp bar member 58 away from tire 60 so that traction device 10 of this invention may be easily mounted thereon so that brace member 26 is positioned against the inside side wall of the tire adjacent the wheel rim. Bar flat 36 on which is mounted the clamp mechanism of this invention is pivoted to seat on the top side of rectangular frame 32. This positions clamp bar member 58 adjacently spaced from the outer side wall of tire 60. The socket of crank member 56 is placed on cap 52 of threaded shaft 50 and made to engage key means 54 and is rotated to advance threaded shaft 50 against clamp bar member 58, pushing member 58 tightly against the side wall of tire 60. Thus securely connected to tire 60, the vehicle may be extricated from its stranded position.

I claim:

1. A traction device for a vehicle tire comprising:

a shoe member;

a first support means radially upstanding from a side of said shoe member;

a first bar member connected to said first support means;

a second support means radially upstanding from the opposite side of said shoe member;

a first flat bar member supported on said second support means, said first flat bar member being disposed substantially normal to said second support means;

a second flat bar member hinged to said first flat bar member, said second flat bar member being pivotable from a position perpendicular to said first flat bar member to a position parallel and contiguous to said first flat bar member;

means for locking said second flat bar member to said first flat bar member when said second flat bar member is in a position parallel and contiguous to said first flat bar member;

a threaded sleeve means and guide sleeve means provided on said second flat bar member;

a threaded shaft member rotatable in said threaded sleeve means; and a second bar member having spaced pins supported in said guide sleeve means, said second bar member being moveable toward said first mentioned bar member by said threaded shaft member.

2. The traction device of claim 1 wherein said shoe member is further characterized as being longitudinally curved to concentrically seat against a vehicle tire.

3. The traction device of claim 1 wherein said threaded sleeve means is further characterized as being connected to said second flat bar member between said guide sleeve means.

4. The traction device of claim 1 wherein said second flat bar member is further characterized as being hinged to said first flat bar member to pivotally move said second bar member away from a vehicle tire positioned between said first and second bar members.

* * * * *